United States Patent
Levert et al.

(10) Patent No.: US 8,322,651 B2
(45) Date of Patent: Dec. 4, 2012

(54) AIRCRAFT ENGINE MOUNT STRUCTURE COMPRISING TWO THRUST LINKS WITH TRANSVERSE FITTING

(75) Inventors: Stephane Levert, Toulouse (FR); Jacques Beaufort, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 671 days.

(21) Appl. No.: 12/304,772

(22) PCT Filed: Jul. 9, 2007

(86) PCT No.: PCT/EP2007/056921
§ 371 (c)(1),
(2), (4) Date: Dec. 15, 2008

(87) PCT Pub. No.: WO2008/006784
PCT Pub. Date: Jan. 17, 2008

(65) Prior Publication Data
US 2009/0200419 A1 Aug. 13, 2009

(30) Foreign Application Priority Data

Jul. 10, 2006 (FR) ...................................... 06 52889

(51) Int. Cl.
*B64D 27/00* (2006.01)
(52) U.S. Cl. ............................ 244/54; 244/53 R; 244/55
(58) Field of Classification Search ............... 244/53 R, 244/54, 55; 248/554; 60/796
See application file for complete search history.

(56) References Cited

U.S. PATENT DOCUMENTS

| 3,844,115 | A | * | 10/1974 | Freid ................................ | 60/797 |
| 4,452,038 | A | * | 6/1984 | Soligny ........................... | 60/796 |
| 5,320,307 | A | * | 6/1994 | Spofford et al. ................. | 244/54 |
| 5,474,258 | A | * | 12/1995 | Taylor et al. .................... | 244/54 |
| 5,725,181 | A | * | 3/1998 | Hey ................................ | 244/54 |
| 5,873,547 | A | * | 2/1999 | Dunstan .......................... | 244/54 |
| 6,296,203 | B1 | * | 10/2001 | Manteiga et al. ............... | 244/54 |
| 6,328,293 | B1 | * | 12/2001 | Olsen ....................... | 267/140.11 |
| 6,758,438 | B2 | * | 7/2004 | Brefort et al. ................... | 244/54 |
| 2004/0251380 | A1 | * | 12/2004 | Pasquer et al. .................. | 244/54 |
| 2005/0067528 | A1 | * | 3/2005 | Loewenstein et al. .......... | 244/54 |
| 2006/0219841 | A1 | * | 10/2006 | Dron et al. ...................... | 244/54 |
| 2008/0169378 | A1 | * | 7/2008 | Beaufort et al. ................ | 244/54 |

FOREIGN PATENT DOCUMENTS

EP 0 805 108 11/1997

* cited by examiner

Primary Examiner — Christopher P Ellis
Assistant Examiner — Medhat Badawi
(74) Attorney, Agent, or Firm — Oblon, Spivak, McClelland, Maier & Neustadt, L.L.P.

(57) ABSTRACT

A mounting structure for an aircraft engine including a rigid structure and a mechanism to mount the engine on the rigid structure. The mounting mechanism includes a thrust load device including two side thrust links each including an aft end mounted on an evener bar of the device, via a mechanical connection. Each connection is formed by a lug provided on the evener bar and passing through an orifice made in the aft end, the lug being arranged so as to extend substantially laterally relative to the mounting structure.

10 Claims, 9 Drawing Sheets

AIRCRAFT ENGINE MOUNT STRUCTURE COMPRISING TWO THRUST LINKS WITH TRANSVERSE FITTING

TECHNICAL AREA

The present invention generally relates to an aircraft engine mount intended to be positioned between an aircraft wing and its related engine, and to an engine assembly comprising said mount.

The invention can be used on any type of aircraft equipped with turbo-jet engines or turboprop engines.

This type of mount called "EMS" for Engine Mounting Structure, can be used indifferently to mount an engine below the aircraft wing, to mount this engine above this same wing, or to position this engine on an aft portion of the aircraft fuselage.

STATE OF THE PRIOR ART

Said mounting structure is designed to form a connecting interface between a gas turbine engine and an aircraft wing. It permits the loads generated by its associated gas turbine engine to be transmitted to the frame of this aircraft, and also provides a pathway for fuel lines, electrical, hydraulic and air systems between the engine and the aircraft.

To ensure the transmission of loads, the mounting structure comprises a rigid structure called a primary structure often of "box" type, i.e. formed by the assembly of upper and lower spars and side panels joined together via transverse ribs.

In addition, the device is provided with mounting means placed between the gas turbine engine and the rigid structure, these means globally comprising two engine attachments, and a thrust device to transmit the thrust loads generated by the gas turbine engine.

In the prior art, this thrust transfer device comprises two side links for example, joined firstly to the case of the gas turbine engine and secondly to an evener bar itself being pivot mounted on the rigid structure of the mounting structure.

Similarly, the mounting structure also comprises another series of attachments forming a mounting system positioned between the rigid structure and the aircraft wing, this system usually consisting of two or three attachments.

Finally, the pylon is provided with a secondary structure ensuring segregation and supporting of aircraft systems whilst carrying aerodynamic cowling.

As mentioned above, the solutions proposed in the prior art provide that the thrust load transfer device integrates two side links each having an aft end pivoted on the side end of the evener bar associated therewith, by means of a hinge pin passing through the thrust link and the evener bar.

Generally, this hinge pin extends substantially vertically and parallel to the pin on which the evener bar is hinged on the connecting bracket secured to the rigid structure of the mounting structure, so as to allow good balancing of this evener bar.

If the thrust load device is assembled between the engine and the rigid structure, it is no longer possible to disconnect/reconnect the thrust links on the evener bar, such operations nonetheless being desired, for example for later dismounting of the engine. It is therefore necessary to carry out disconnection/reconnection of the entire evener bar carrying the thrust links by dismounting/mounting the hinge pin of this evener bar on the rigid structure.

However, this manner of proceeding requires the positioning of large-size tooling in an area that is little accessible and much congested. The lower end of the evener bar hinge pin, intended to cooperate with the tooling, effectively lies very close to the gas turbine engine casing which it faces.

Hence the setting up and handling of this tooling generate high risks of deteriorating the engine assembly, and at all events are synonymous with operating difficulties that are penalizing in terms of assembly time. By way of indication, these disadvantages are particularly encountered when the tooling is placed in position between the casing of the gas turbine engine and the underside of the evener bar pivot mounted about the above-mentioned hinge pin.

SUMMARY OF THE INVENTION

The purpose of the invention is therefore to propose a mounting structure and an engine assembly comprising said device with which to overcome the above-described disadvantages related to prior art embodiments.

For this purpose, the subject-matter of the invention is a mounting structure for aircraft engine comprising a rigid structure and means to mount the engine on the rigid structure, the mounting means comprising a thrust load device to transmit loads generated by the engine, this thrust load device comprising two side thrust links each having an aft end mounted on the evener bar of the device, via a mechanical connection. According to the invention, each mechanical connection is achieved by means of a lug provided on the evener bar and passing through an orifice made in the aft end of the associated thrust link, this lug being arranged so as to extend substantially cross-wise relative to the mounting structure.

Therefore, with this configuration particular to the invention, in which each lug extends substantially in transverse direction to the device or slightly at an angle thereto, it becomes easily possible to disconnect/reconnect the aft end of each of the side thrust links e.g. for an engine dismounting/remounting operation. On this account, it is advantageously no longer necessary to dismount/remount the evener bar assembly when carrying out this type of operation.

The setting up and handling of the tooling required to mount/dismount each of the side thrust links generate practically no risk of deteriorating the engine assembly, insofar as the free end of each lug is oriented towards an area of this engine assembly that is little congested. In this respect, it is specified that as a consequence the tooling required is advantageously less voluminous than required in the prior art to ensure dismounting/remounting of the evener bar assembly carrying the aft ends of the side thrust links.

Additionally, the easy mounting provided by said arrangement allows savings in terms of assembly time, this also being optimized by the fact that the aft ends of the side thrust links can henceforth be easily interlocked into their associated lug by a mere substantially lateral movement of these links initially connected to the engine via their forward end.

Preferably, provision is made so that each lug extends along an axis lying in a solid angle in the form of a cone of revolution whose central axis corresponds to a transverse direction of the mounting structure, and having a value equal to or less than $2\pi \cdot (1-\cos(15°))$ sr, this characteristic illustrating the notion of substantially transversal extension of the above-mentioned lugs. The value indicated above translates a solid angle in the form of a cone of revolution whose generatrix is distanced away from the central axis by an angle of 15°.

Again to illustrate this notion, provision is preferably made so that, from an overhead view, each lug therefore extends along an axis forming an angle having a value equal to or less than 15° with a transverse direction of the mounting structure and/or so that from a front view each lug extends along an axis having an angle equal to or less than 15° with this transverse direction.

Preferably, for each mechanical connection, the orifice made in the aft end of the thrust link is equipped with a ball joint through which the lug on the evener bar is passed.

Preferably, the evener bar is pivoted about a hinge pin which also passes through a bracket for connection to the rigid structure, the thrust load device also comprising an abutment bracket in the shape of a horse-shoe whose central part is crossed by the hinge pin and which is intended to be fixedly joined to the rigid structure, the horse-shoe shaped abutment bracket having an abutment surface located aftwardly relative to the evener bar so that it is able to stop rotation of this evener bar about its hinge pin in both directions.

Preferably, the engine mount means also comprise a forward engine attachment and an aft engine attachment fixed to the rigid structure, the forward engine attachment being designed to transmit loads exerted along a transverse direction of the device and along the vertical direction of the device, and the aft engine attachment being designed to transmit loads exerted along the transverse and vertical directions of the device and to ensure transmission of the moment exerted along a longitudinal direction of this device.

As is usually the case, the two side thrust links are preferably arranged either side of a vertical, longitudinal median plane of the mounting structure.

A further subject-matter of the invention is an engine assembly comprising an engine such as a gas turbine engine and a mounting structure for this engine, the mounting structure being such as the one just described.

Finally, the invention also relates to an aircraft comprising at least one engine assembly such as indicated above, assembled onto a wing or an aft fuselage part of this aircraft.

Other advantages and characteristics of the invention will become apparent from the detailed, non-limiting, description given below.

BRIEF DESCRIPTION OF THE DRAWINGS

This description will be made with reference to the appended drawings amongst which.

DETAILED DESCRIPTION OF PREFERRED EMBODIMENTS

Figure 1:
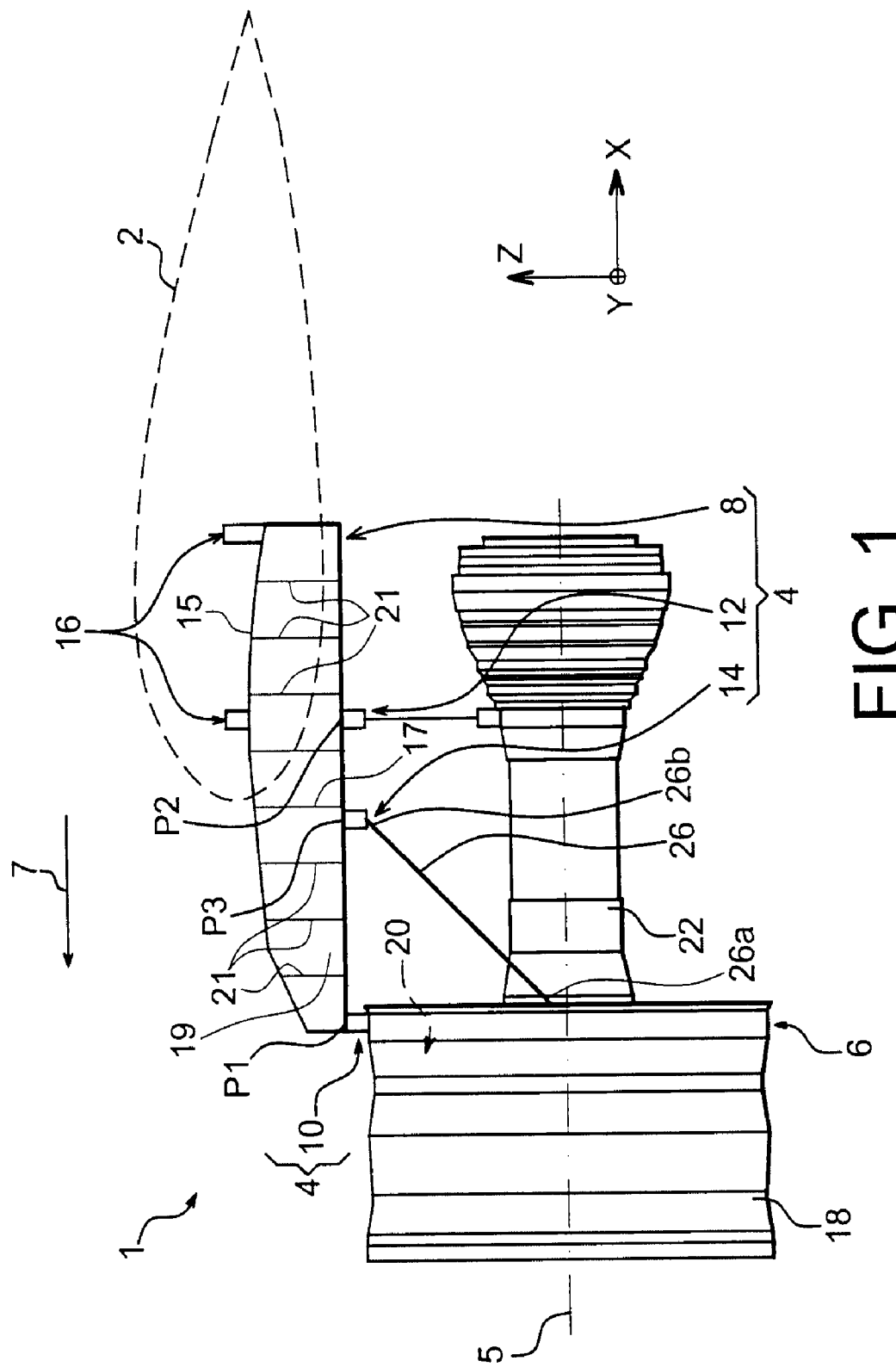
FIG. 1 gives a side view of an aircraft engine assembly comprising a mounting structure according to a preferred embodiment of the present invention.

With reference to FIG. 1, an aircraft engine assembly 1 can be seen, intended to be secured below a wing 2 of this aircraft which is solely illustrated as a dashed outline for reasons of clarity, this assembly 1 comprising a mounting structure 4 according to one preferred embodiment of the present invention, an engine 6 e.g. a turbo-jet engine being mounted below this device 4.

Globally, the mounting structure 4 comprises a rigid structure 8 carrying means to mount the engine 6, these mounting means having a plurality of engine attachments 10, 12, and a thrust load device 14 to transmit the thrust loads generated by the engine 6.

By way of indication, it is noted that the assembly 1 is intended to be surrounded by a nacelle (not shown) and the mounting structure 4 comprises another series of attachments 16 for the mounting of this assembly 1 below the wing 2 of the aircraft.

In the remainder of the following description, X designates the longitudinal direction of the device 4 which is comparable to the longitudinal direction of the gas turbine engine 6 and of device 14, this direction X being parallel to a longitudinal axis 5 of the turbo-jet engine 6. Y is used to designate the transverse-oriented direction relative to the device 4 and is comparable to the transverse direction of the turbo-jet engine 6 and of device 14, and Z designates the vertical direction or height, these three directions, X, Y and Z lying orthogonal to each other.

Also the terms "forward" and "aft" are to be considered relative to the direction of travel of the aircraft subsequent to the thrust exerted by the turbo-jet engine 6, this direction being schematically represented by arrow 7.

FIG. 1 illustrates the two engine attachments 10, 12, the series of attachments 16, the thrust load device 14 and the rigid structure 8 of the mounting structure 4. The other constituent elements of this device 4 that are not shown, such as the secondary structure ensuring segregation and supporting of the systems whilst carrying the aerodynamic cowling, are conventional elements identical or similar to those found in the prior art and known to those skilled in the art. They are therefore not described in detail.

Also, it is indicated that the turbo-jet engine 6 is equipped forwardly with a large-size fan case 18 delimiting an annular fan duct 20, and aftwardly comprises a central casing 22 of smaller size, enclosing the core of this turbo-jet engine. The casings 18 and 20 are evidently secured to one another.

As can be seen FIG. 1, the engine attachments 10, 12 of the device 4 are designed to be two in number and are respectively called the forward engine attachment and the aft engine attachment.

In this preferred embodiment of the present invention, the rigid structure 8 is in the form of a box extending from aft to forward substantially along direction X.

The box is then in the form of a pylon of similar design to that usually seen for mounting pylons of turbo-jet engines, particularly in that it is formed of the assembly of an upper spar 15, a lower spar 17 and two side spars/panels 19 (only one being visible since this is a side view), these parts 15, 17, 19 being connected together via transverse ribs 21 each globally assuming the form of a rectangle. Therefore the ribs 21 extend along planes YZ, the spars 15, 17 roughly extend along planes XY, and the side panels 19 along planes XZ.

The mounting means in this preferred embodiment firstly comprise the forward engine attachment 10 positioned between a forward end of the of the rigid structure 8, also called a pyramid, and an upper portion of the fan case 18. Nevertheless, it would also be possible to provide for the forward engine attachment 10 to be fixed to a connecting case between the central casing and the fan case as is known to those skilled in the art. The forward engine attachment 10, of conventional design and known to persons skilled in the art, is attached to a first point P1 of the rigid structure 8, this structure also being called a primary structure.

Also, the aft engine attachment 12, also of conventional design known to those skilled in the art, is positioned between the rigid structure 8 and the central casing 22, and is attached to a second point P2 of the rigid structure 8 positioned aftward relative to point P1.

In this preferred embodiment, the thrust load device 14 is attached to a third point P3 of the rigid structure 8, point P3 being located between points P1 and P2.

Globally the thrust load device 14 has two side thrust links 26 (only one being visible in FIG. 1) each of these links comprising a forward end 26a joined to the fan case 18, for example on or close to a horizontal median plane of the gas turbine engine 6.

The aft portion of this thrust load device 14 will now be described with reference to FIGS. 2 and 3.

In these figures, it can be seen that the two side links 26, arranged either side of the vertical, longitudinal median plane 24 of the mounting structure, also corresponding to a vertical median plane of the gas turbine engine, each have an aft end 26b connected to an evener bar 28, as will be detailed below.

The evener bar 28 is coupled to a hinge pin 32, preferably of dual pin type, positioned so that the longitudinal vertical median pane 24 passes through it. This hinge pin of the evener bar therefore passes through an orifice 34 made in the evener bar 28 itself, and through a clevis 36 whose two sides are arranged either side of the evener bar 28, this clevis 36 belonging to a connecting bracket 38 to the rigid structure.

Figure 2:
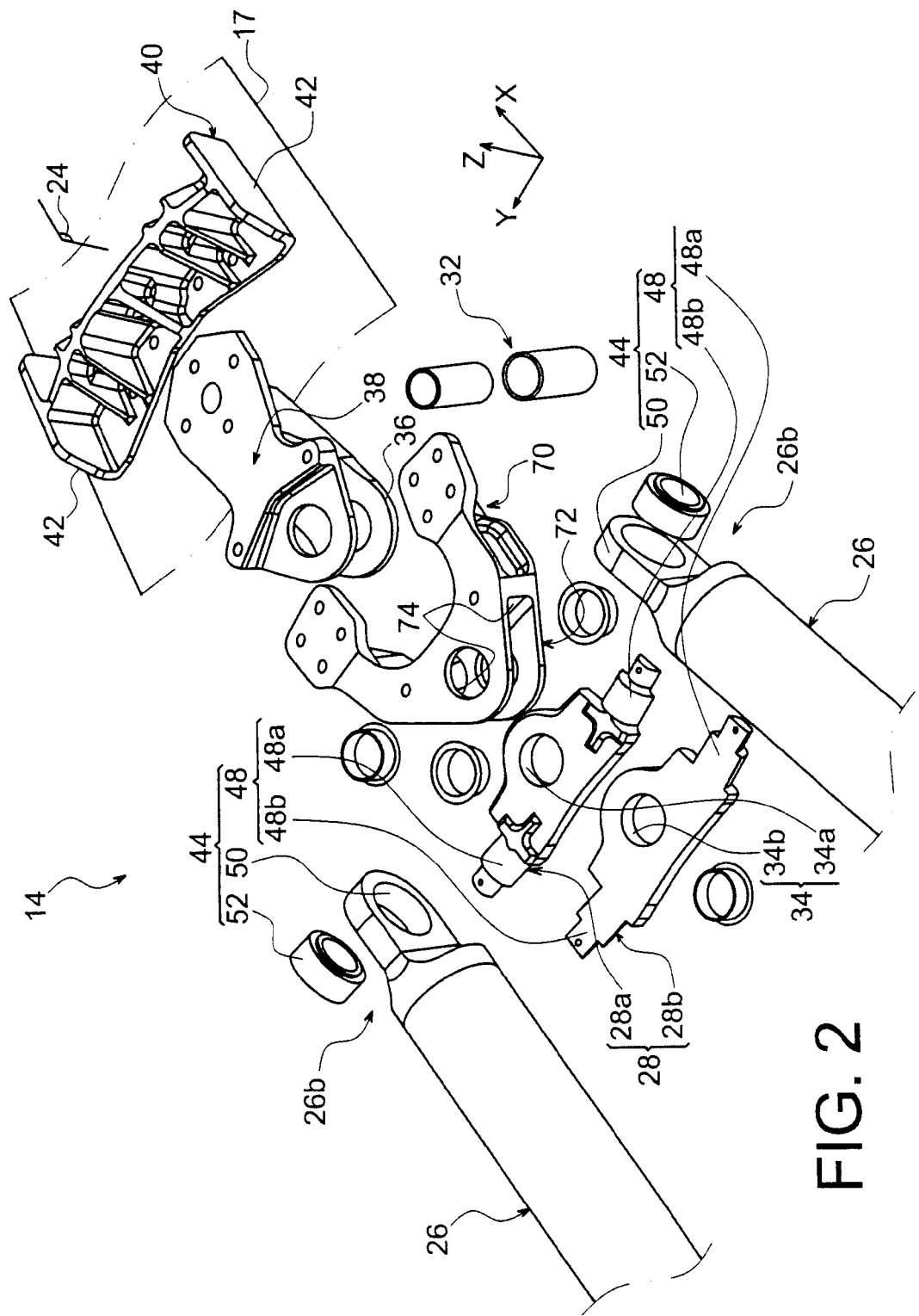
FIG. 2 is a partial, perspective, exploded view of the thrust load device belonging to the mounting structure shown FIG. 1.
Figure 3:
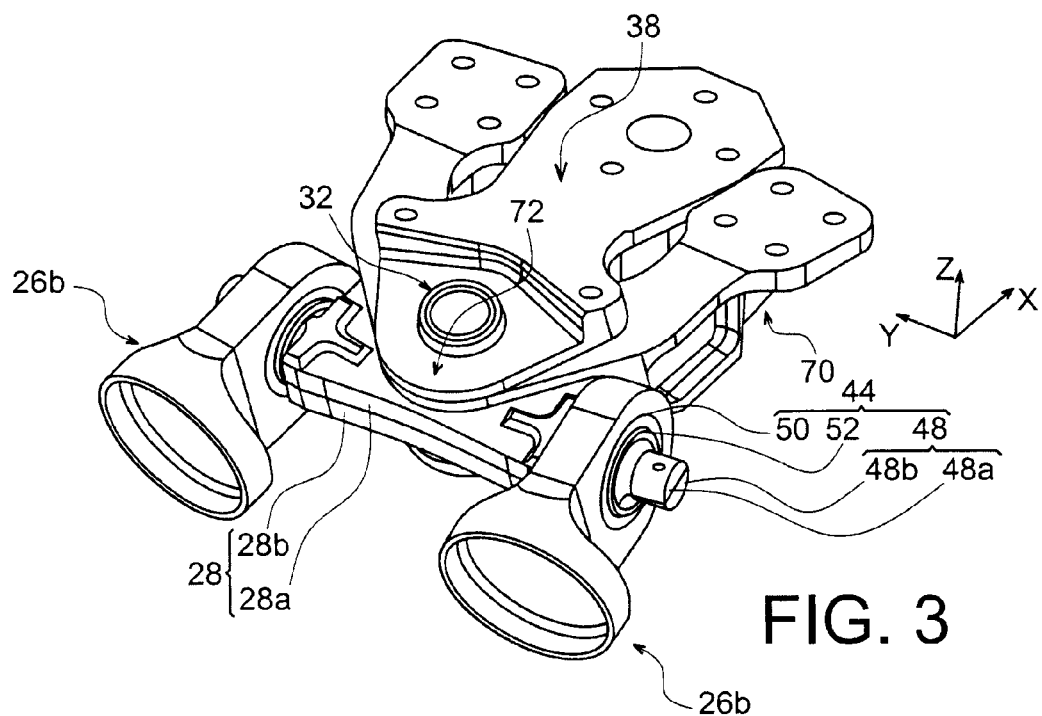
FIG. 3 is a non-exploded view of the thrust load device shown FIG. 2.

More precisely, to ensure a so-called Fail-Safe function, the evener bar 28 preferably consists of two superimposed brackets 28a, 28b as shown FIG. 2, the above-mentioned orifice 34 therefore being jointly defined by the two orifices 34a, 34b provided on brackets 28a, 28b respectively.

The connecting bracket 38 has one aft end fixedly attached underneath the lower spar 17 with which it is preferably in contact, the assembly means used (not shown) of bolt type for example cooperating with a reinforcement bracket 40 housed inside the box, and preferably being in contact with the inner surface of the lower spar 17. In this respect, provision may be made for this reinforcement bracket 40 to have two side walls 42 intended to be respectively attached to two fins (not shown) of the lower spar 17 of the box, its lower sidewall therefore following the contour of the inner surface of this same lower spar 17. Therefore the reinforcement bracket 40 is similar to the transverse ribs of the box, with the difference that it does not extend over the entire height of the rigid structure.

To ensure the assembly of the aft end 26b of each link 26, a mechanical connection 44 is provided forming the connection via which thrust loads are intended to be normally transmitted. It essentially consists of a lug 48 provided on the associated side end of the evener bar 28, this lug 48 having the particular aspect of extending substantially cross-wise relative to the device 14, namely substantially in direction Y even if it may lie at a slight angle to this direction, as will be described below. In this respect, provision is made so that the lug extends preferably orthogonally relative to the axis of the side link 26 through which it passes.

Here again, owing to the dual nature of the bracket used to form the evener bar 28, each of the two lugs 48 is preferably defined by two semi-cylinders 48a, 48b respectively belonging to brackets 28a, 28b and lying in contact with one another along their diametrical face. Each lug 48 is effectively preferably provided with a circular section and optionally comprises an extension of smaller section to receive the securing means (not shown) as can be seen FIGS. 2 and 3.

The lug 48 enters into the orifice 50 provided on the aft end 26b of the thrust link 26 concerned, the axis of this orifice then substantially merging with the axis of the above-mentioned lug 48. Also, a ball joint 52 is provided between the orifice 50 and the lug 48, this lug passing through an inner ring of the ball joint, whilst the outer ring thereof is housed fixedly in orifice 50.

Figure 4A:
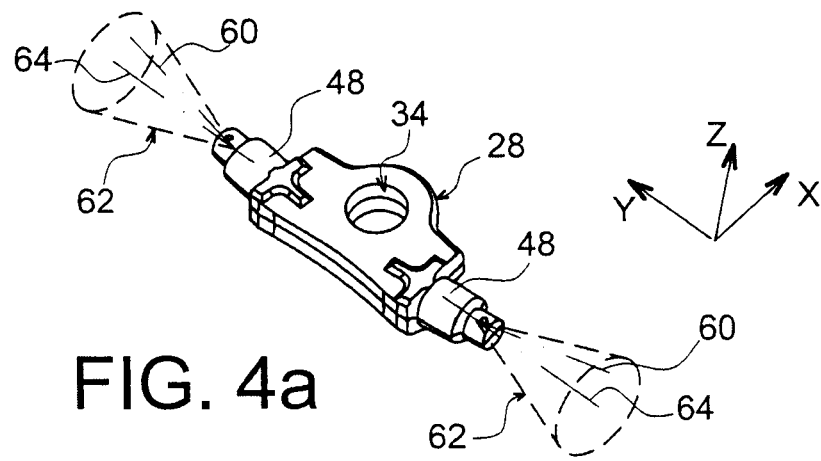
FIGS. 4a to 4c illustrate the substantially transverse orientation of the lugs provided on the evener bar belonging to the thrust load device shown FIGS. 1 to 3.
Figure 4B:
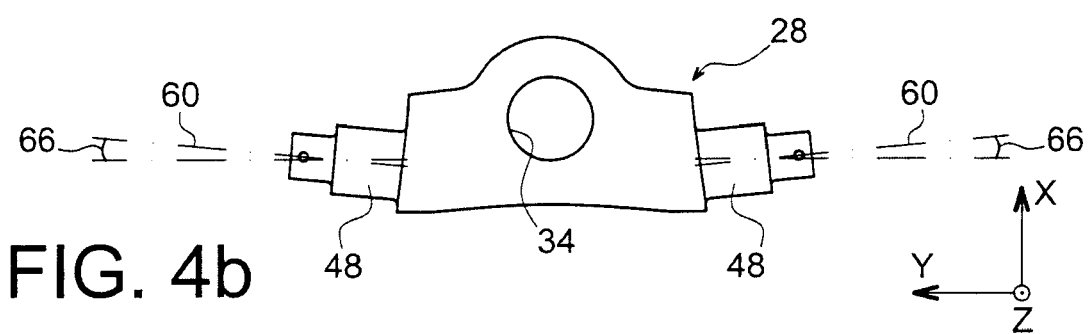
Figure 4C:
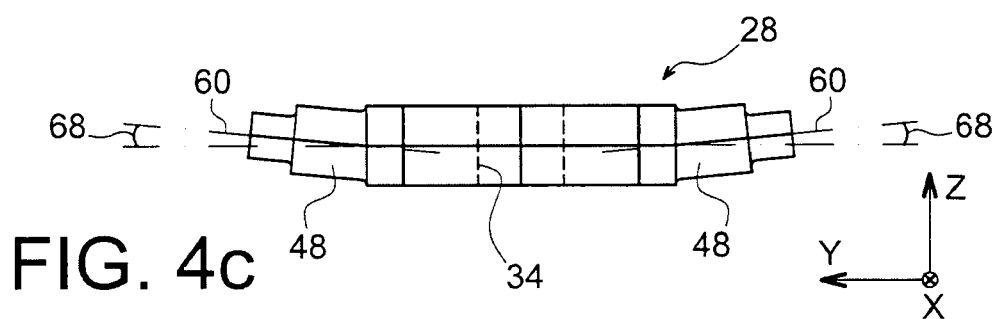

With reference now to FIGS. 4a to 4c, it can be seen that each pin 48 can be oriented not only along direction Y, but also alternatively it can lie slightly at an angle thereto, the objective being to maintain a substantially transverse orientation for these lugs at all times, so that the mounting of the associated mechanical connection 44 remains easy without any risk of deteriorating the engine assembly 1. Additionally, it is preferably sought to give the lug an orthogonal direction relative to the axis of the thrust link 26 through which it passes.

Therefore, as shown FIG. 4a, provision may be made so that each lug 48 extends along an axis 60 lying in a solid angle 62 in the form of a cone of revolution whose central axis 64 corresponds to direction Y, the value of this solid angle 62 then being equal to or less than $2\pi \cdot (1-\cos(15°))$ sr.

Also, with reference to FIG. 4b, provision is made so that from an overhead view such as shown, each lug 48 extends along an axis 60 forming an angle 66 having a value equal to or less than 15° with the transverse direction Y. Similarly provision is made so that from a front view such as shown FIG. 4c, each lug 48 extends along an axis 60 forming an angle 68 of value equal to or less than 15° with the transverse direction Y.

At all events, as shown FIGS. 4a to 4c, provision is preferably made so that each lug 48 extends slightly aftward away from the centre of the thrust load device, and optionally so that each lug 48 extends slightly upward away from the centre of this same thrust load device.

Again with reference to FIGS. 2 and 3, it can be seen that the thrust load device 14 also comprises an abutment bracket 70 that is horse-shoe shaped, which is arranged at a forward central portion of a clevis 72 through which the hinge pin 32 also passes. More precisely, the two sidewalls of this clevis 72 are arranged either side of the evener bar 28 and more specifically are each inserted between this evener bar 28 and one of the two sidewalls of the clevis 36 of the connecting bracket 38.

The horseshoe-shaped abutment bracket 70, preferably arranged so that the median plane 24 passes symmetrically through it, comprises two free ends substantially oriented aftwardly, each one being fixed to the box in similar manner to the connecting bracket 38, namely by following the outer contour of the lower spar 17 and being assembled thereto via conventional assembly means (not shown) cooperating with the reinforcement bracket 40.

In addition, the abutment bracket 70 has an abutment surface 74 lying aftward relative to the evener bar 28, and being more precisely defined at the bottom part of the above-mentioned clevis 72. It is designed so that it can, in both directions, stop rotation of the evener bar about its hinge pin 32.

The abutment surface 74, which may optionally consist of two separate surfaces arranged symmetrically relative to the vertical median plane 24 as shown FIG. 2, is effectively positioned judiciously so that in the event of failure of the thrust load device 14, possibly occurring as rupture of one of the thrust links 26 or rupture of one of the two connections 44, the rotation of the evener bar 28 is stopped by this surface 74. It is to be noted that under normal operation this abutment surface 74 evidently remains inactive, since the evener bar 28 then lies away from it.

Therefore, when failure of the above-mentioned type occurs, the evener bar 28 which is then only connected via a single thrust link 26, pivots about its hinge pin 32 until one of its side ends contacts the abutment surface 74 lying in the vicinity. It is therefore to be appreciated that the positioning of the abutment surface 74 is chosen so as to impose a maximum angle of rotation of this evener bar about the hinge pin 32, this maximum angle preferably being identical for both directions of rotation and evidently being determined so that the thrust load transmitting function is able to be ensured by the thrust load device 14 at least for a determined time.

Figure 5:
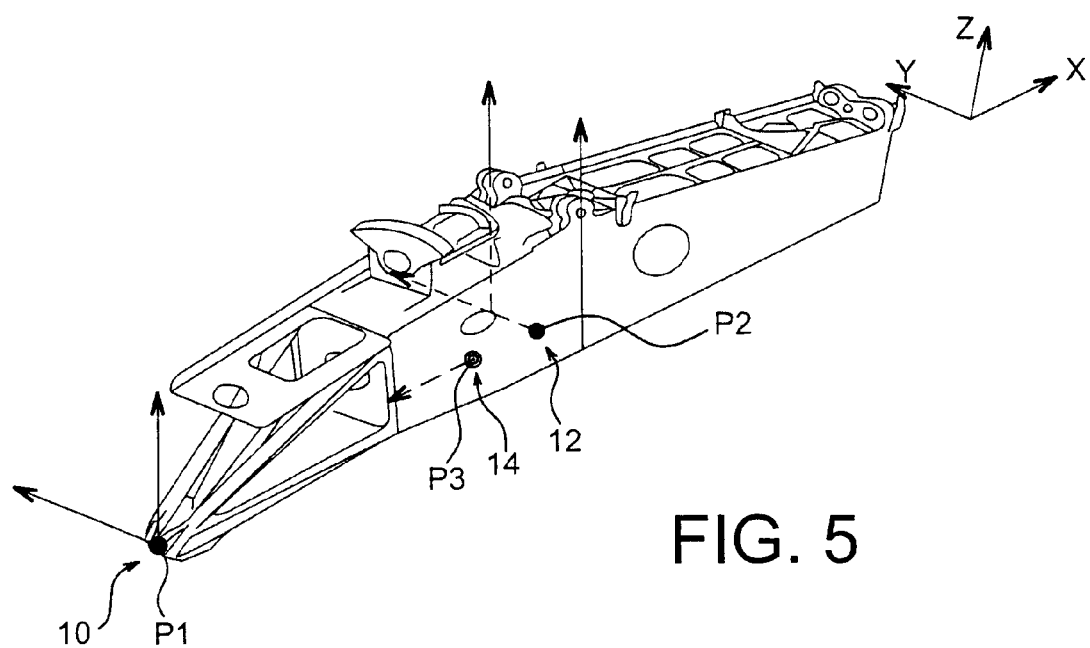
FIG. 5 is a schematic, perspective view showing the thrust load transmission ensured by the different constituent elements of the mounting means of the device shown FIG. 1.

With said arrangement, as can be schematically seen FIG. 5, the forward engine attachment 10 attached to point P1 is designed so as to transmit loads exerted chiefly in the vertical direction Z, and also in the transverse direction Y, but is not adapted to transmit loads exerted in the longitudinal direction X.

The aft engine attachment 12 is designed to transmit loads chiefly exerted in the transverse direction Y, and its chosen design is preferably of a known type called "semi-attachment" type enabling each of the two semi-attachments (not shown) to transmit the loads exerted chiefly in the vertical direction Z. The aft attachment is additionally capable of ensuring transmittal of the moment exerted in direction X.

Finally, the thrust load device 14 is able to transmit loads exerted chiefly in the longitudinal direction X.

In this way, the loads exerted along the longitudinal direction X are solely transmitted by the thrust load device, the loads exerted in the transverse direction Y are jointly transmitted by the forward 10 and aft 12 attachments, and the loads exerted in the vertical direction Z are also jointly transmitted by the forward attachment 10 and the two semi-attachments of the aft attachment 12.

Also, transmitting of the moment exerted in direction X is ensured solely by the two semi-attachments of the aft attachment 12, whilst transmitting of the moments exerted in directions Y and Z is jointly ensured by these two engine attachments 10, 12.

With reference to FIGS. 6a to 6e, different successive steps are illustrated of an assembly method for the mounting structure 14, the views globally being underside views.

Figure 6A:
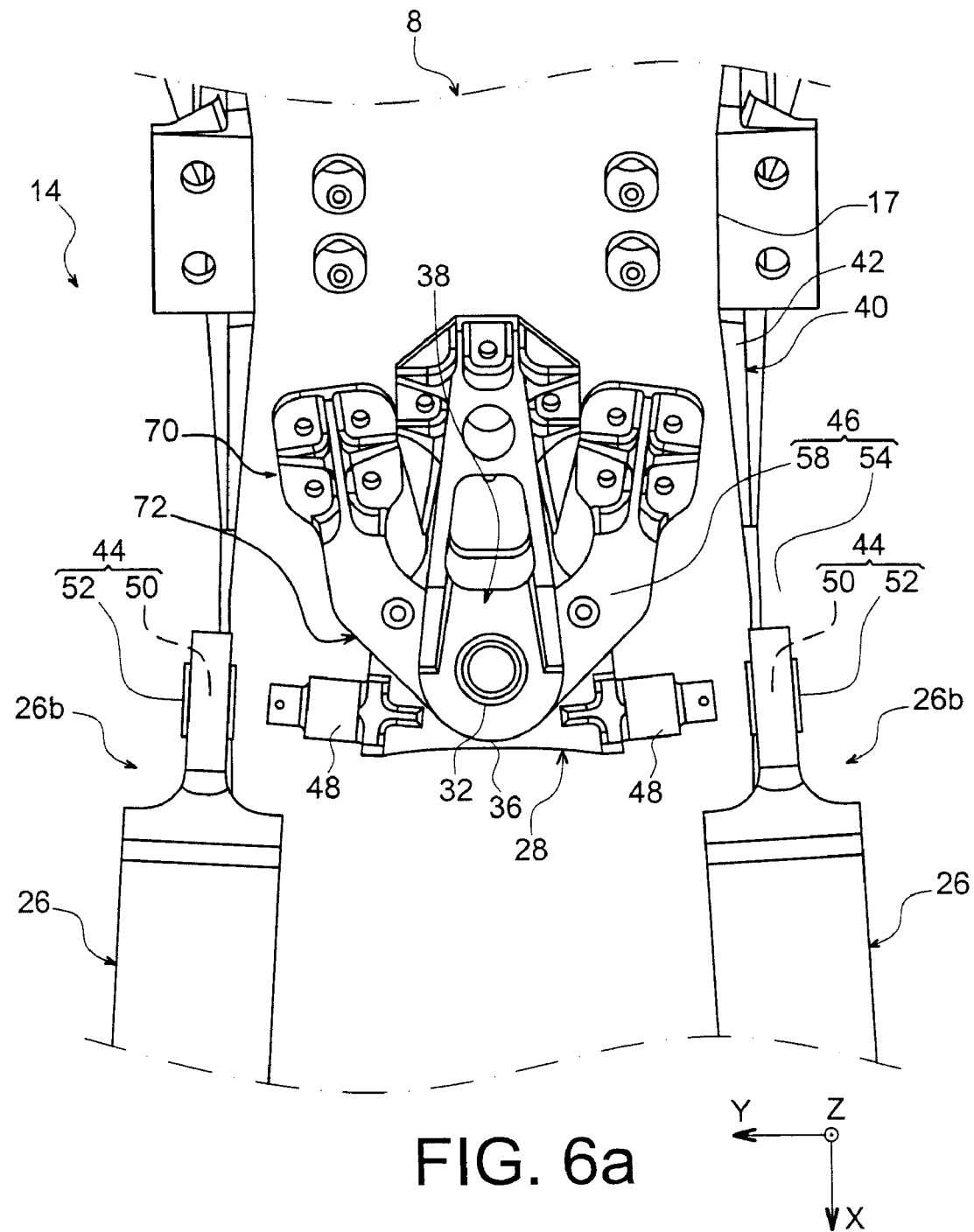
FIGS. 6a to 6e are views schematizing the mounting of the aft end of each of the two thrust links onto its associated lug on the evener bar.
Figure 6B:
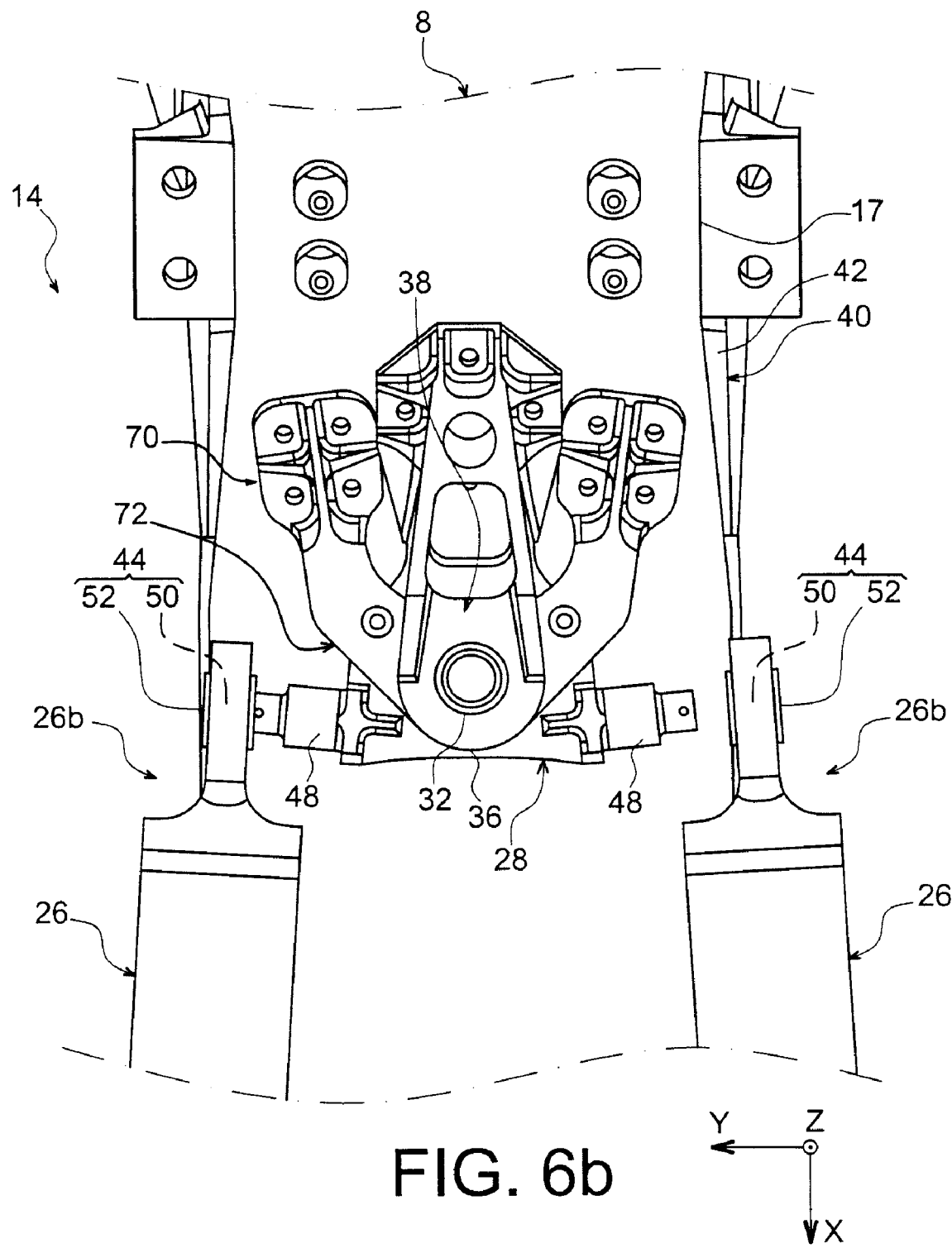
Figure 6C:
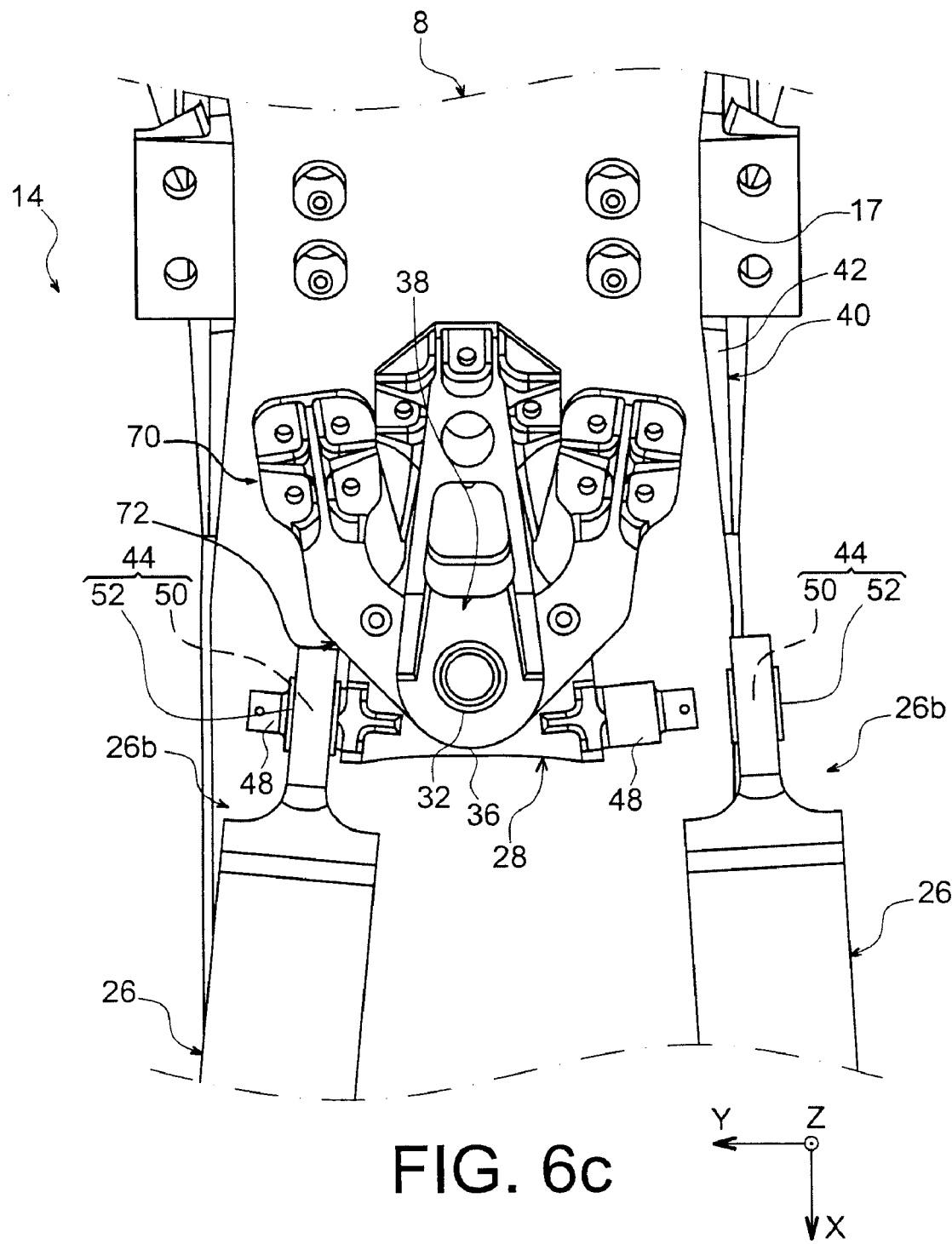

First, with reference to FIG. 6a, it can be seen that one of the specificities of the method lies in the fact that, prior to mounting the aft ends of the thrust links onto their respective associated lugs, the evener bar 28 has already been fixed to the rigid structure 8 via the connecting bracket 38. Evidently, before starting to engage the aft end 26b of the first link 26 onto its associated lug 48 such as shown FIG. 6b, the engine is suitably positioned relative to the rigid structure 8 of the pylon.

As mentioned previously, the engaging of the aft end 26b of the thrust link 26 can be made by a mere substantially lateral movement of the link lying close to the lug concerned. Also, since the front end 26a of the thrust link 26 is already mounted on the engine, this movement can roughly be compared to slight rotation of the thrust link about its front end 26a, so as to achieve full engagement of the aft end 26b onto the lug 48, as shown FIG. 6c.

Figure 6D:
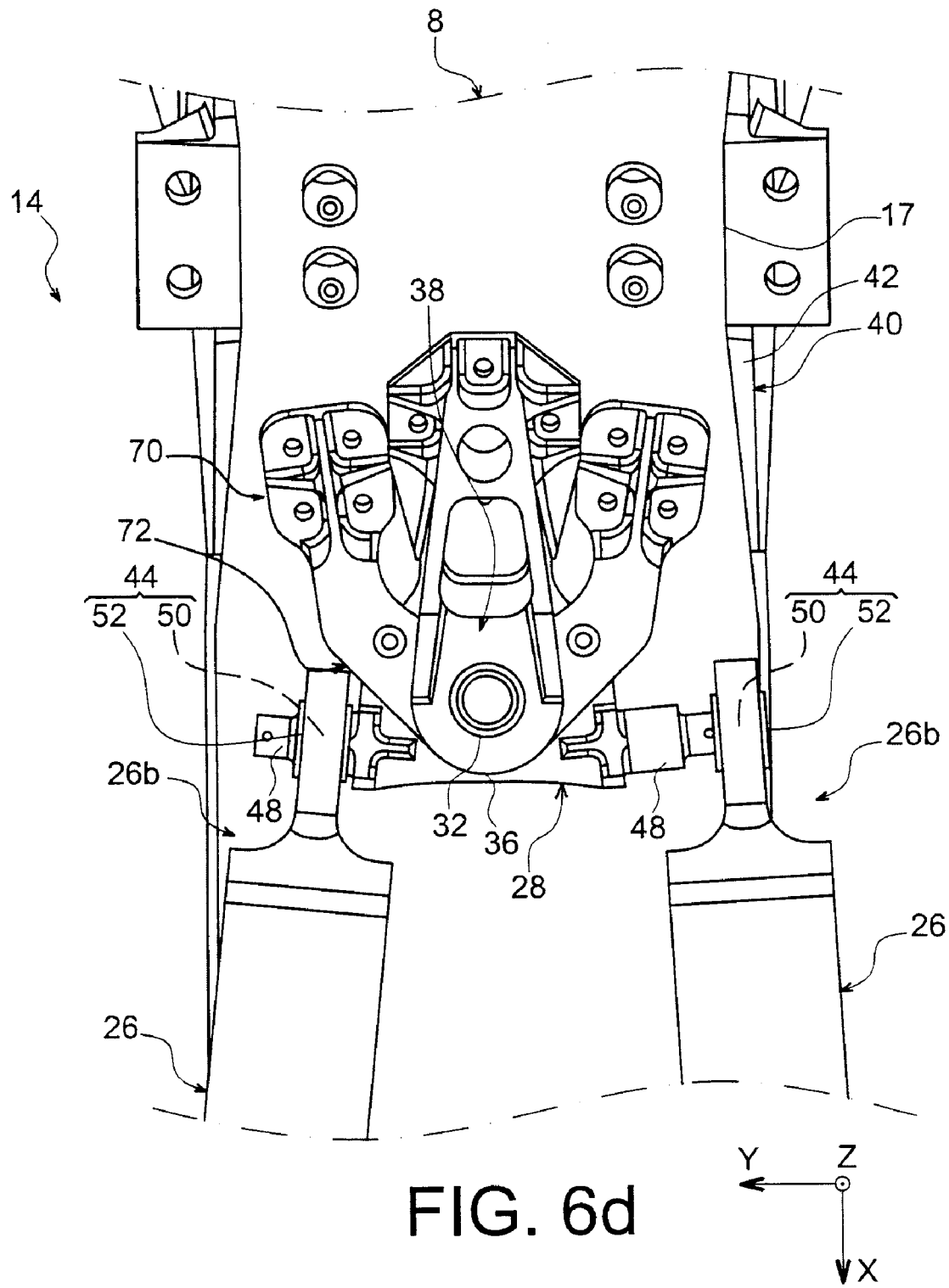
Figure 6E:
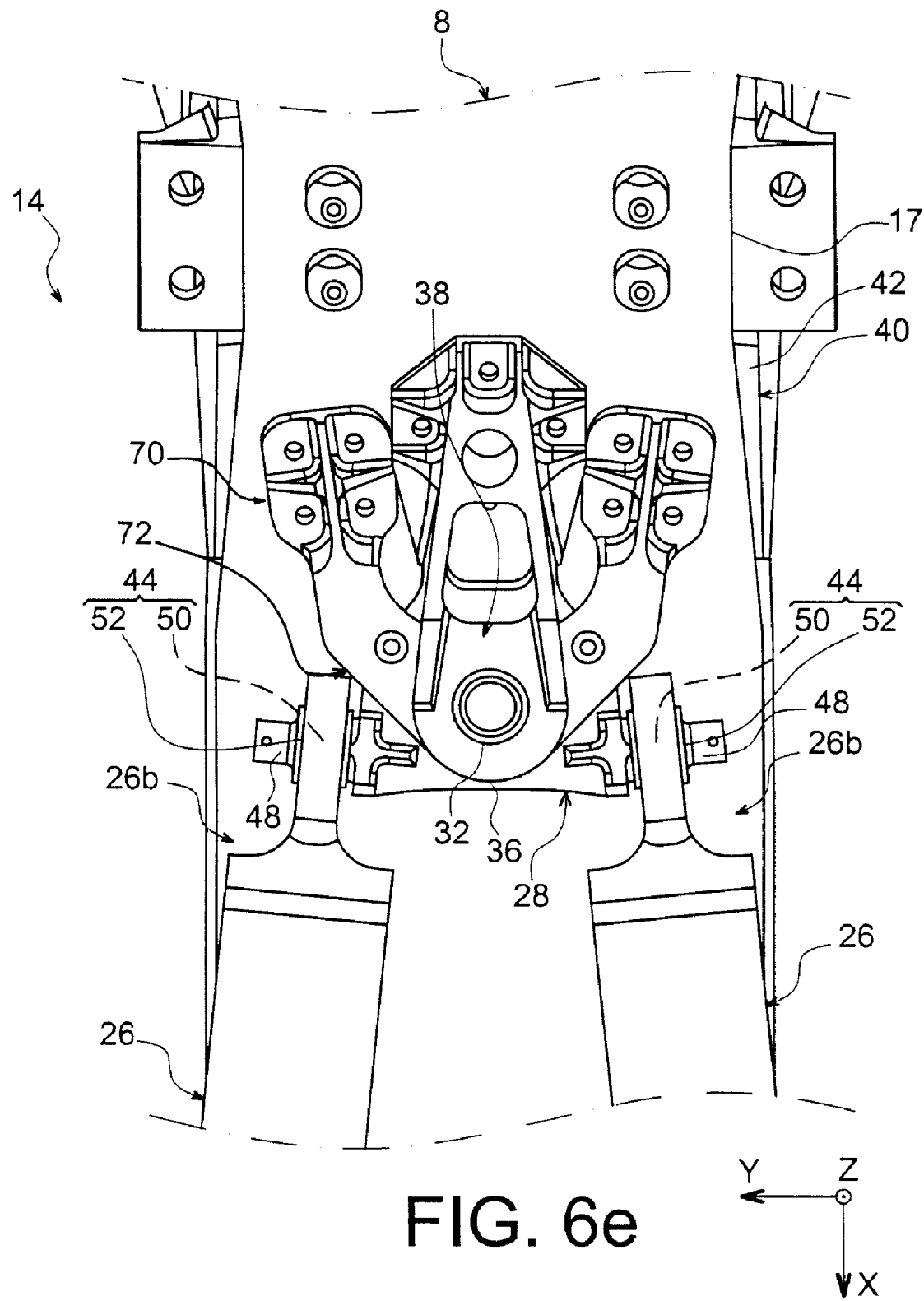

Next, the same operations are carried out for the other thrust link 26, such as shown FIGS. 6d and 6e, although the mounting of the two links 26 could evidently be performed simultaneously without departing from the scope of the invention.

Evidently, various modifications could be made by persons skilled in the art to the mounting structure 4 and engine assembly 1 just described solely as non-limiting examples. In this respect, it can notably be indicated that while the engine assembly 1 has been presented in a configuration adapted for mounting below the aircraft wing, this assembly 1 could also have a different configuration allowing it to be mounted above this same wing, even on an aft portion of the fuselage of this aircraft.

The invention claimed is:

1. A mounting structure for an aircraft engine comprising:
   a rigid structure; and
   means to mount the engine on the rigid structure, the mounting means comprising a thrust load device to transmit thrust generated by the engine, the thrust load device comprising a bracket fixed to said rigid structure, an evener bar connected to said bracket via a hinge pin, and two side thrust links each including an aft end mounted on said evener bar, via a mechanical connection, the thrust load device further comprising a horseshoe-shaped abutment bracket having a central part receiving the hinge pin,
   wherein each said mechanical connection includes a lug provided on the evener bar and passing through an orifice made in the aft end of the associated thrust link, the lug configured to extend substantially cross-wise relative to the mounting structure,
   wherein each said mechanical connection further comprises a ball joint in said orifice and between said aft end of said associated thrust link and said lug, said ball joint including an inner ring and an outer ring, said lug passing through said inner ring and said outer ring being housed fixedly in said orifice, and
   wherein said evener bar is configured to rotate relative to said rigid structure about said hinge pin upon failure of one of the mechanical connections.

2. A mounting structure for an engine according to claim 1, wherein each lug extends along an axis lying in a solid angle in a form of a cone of revolution whose central axis corresponds to a transverse direction of the mounting structure, and having a value equal to or less than $2\pi \cdot (1-\cos(15°))$ sr.

3. A mounting structure for an engine according to claim 1, wherein from an overhead view, each lug extends along an axis forming an angle of value equal to or less than 15° with a transverse direction of the mounting structure.

4. A mounting structure for an engine according to claim 1, wherein from a front view each lug extends along an axis forming an angle of value equal to or less than 15° with a transverse direction of the mounting structure.

5. A mounting structure for an engine according to claim 1, wherein for each said mechanical connection, the lug extends orthogonally relative to an axis of the side thrust link through which it passes.

6. A mounting structure for an engine according to claim 1, wherein the evener bar is pivoted about the hinge pin that also passes through the bracket connecting the evener bar to the rigid structure, the horseshoe-shaped abutment bracket being fixedly secured to the rigid structure and comprising an abutment surface lying aftward relative to the evener bar configured to stop rotation of the evener bar, in both directions, about its hinge pin.

7. A mounting structure for an engine according to claim 1, wherein the mounting means of the engine further comprises a forward engine attachment and an aft engine attachment attached to the rigid structure, the forward engine attachment configured to transmit loads exerted in a transverse direction of the device and in a vertical direction of the device, and the aft engine attachment configured to transmit the loads exerted in the transverse and vertical directions of the device and to ensure transmitting of the moment exerted in a longitudinal direction of the device.

8. A mounting structure for an engine according to claim 1, wherein the two side thrust links are arranged either side of a vertical, longitudinal median plane of the mounting structure.

9. An engine assembly comprising:
- an engine; and
- a mounting structure for the engine, wherein the mounting structure is a device according to claim 1.

10. An aircraft comprising:
- at least one engine assembly according to claim 9, assembled on a wing or on an aft fuselage portion of the aircraft.

\* \* \* \* \*